M. GOLDBERGER.
TAILOR'S MEASURING DEVICE.
APPLICATION FILED MAR. 21, 1910.
1,079,333.
Patented Nov. 25, 1913.
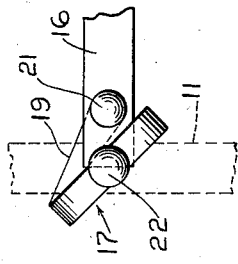
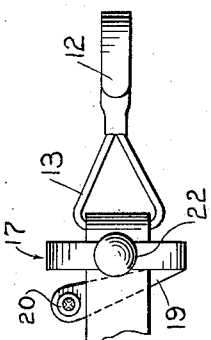
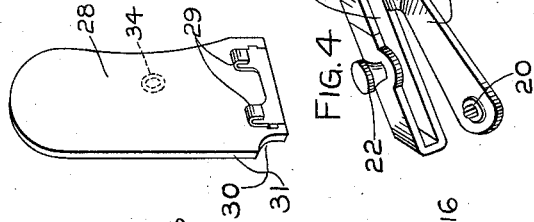
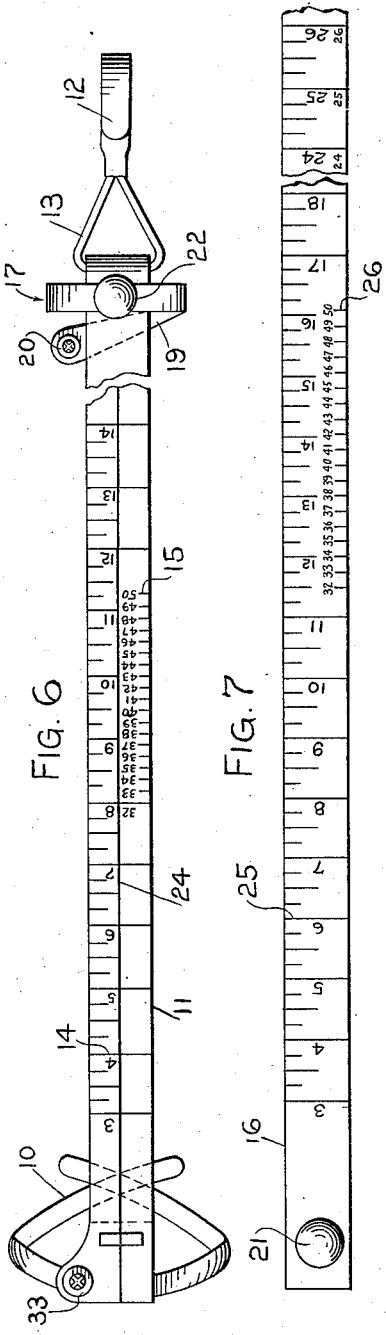
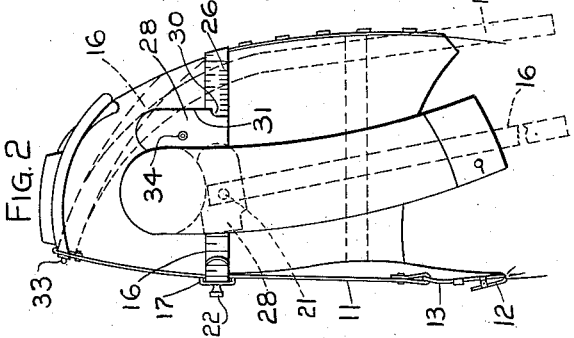
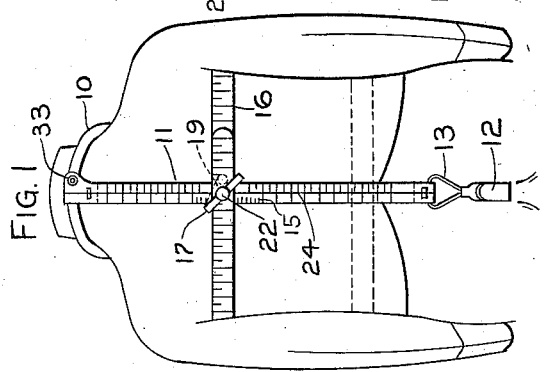
WITNESSES
H. Goldberger
W. Goldberger
INVENTOR
MAX GOLDBERGER
By William M. Hall
HIS ATT'Y.

UNITED STATES PATENT OFFICE.

MAX GOLDBERGER, OF CHICAGO, ILLINOIS.

TAILOR'S MEASURING DEVICE.

1,079,333.  Specification of Letters Patent.  Patented Nov. 25, 1913.

Application filed March 21, 1910. Serial No. 550,702.

*To all whom it may concern:*

Be it known that I, MAX GOLDBERGER, a citizen of the United States, and a resident of Chicago, in the county of Cook and State of Illinois, have invented certain new and useful Improvements in Tailors' Measuring Devices; and I do hereby declare that the following is a full, clear, and exact description thereof, reference being had to the accompanying drawings, and to the characters of reference marked thereon, which form a part of this specification.

This invention relates to a novel measuring device for tailor's use for taking measurements for coats and other garments, and the invention consists in the matters hereinafter set forth and more particularly pointed out in the appended claims.

The device herein shown is an improvement on the similar device illustrated in my pending application for United States Letters Patent, Serial Number 542,829, filed February 9th, 1910, the device being constructed and arranged to enable unskilled persons to take measurements and transmit the same from a local or branch agency to a central tailoring establishment where the garments are made.

The object of the present invention is to simplify the construction of the device; to reduce the number of parts thereof without sacrificing any of its advantages, and to arrange the parts of the device in such a way that the operation of taking the measurements is simplified and the measurements taken thereby are in the highest degree accurate.

As shown in the drawings, Figure 1 illustrates an outline of the bust of a human figure in rear elevation, showing the manner of using my novel measuring device. Fig. 2 is a side elevation of the bust outline, illustrating further uses of the device. Fig. 3 is an enlarged view of a looped fitting which holds the two tapes of the device in proper angular relation at the back of the figure. Fig. 4 is a perspective view of said looped fitting. Fig. 5 is a perspective view of a combined gage and crotch piece, hereinafter to be described. Fig. 6 is an elevation of the graduated back tape and the neck clasp by which it is adjusted to the base of the neck. Fig. 7 is an elevation of a graduated tape employed to take the bust, waist and various other measurements.

The neck piece or clasp 10 and the back tape 11 are made generally like the same parts shown in my aforesaid prior application. The said tape is held taut along the center line of the back by means of a suitable catch or clasp 12 at the lower end thereof and which engages the trousers and is connected to the tape by an elastic connection 13. The tape is provided along its length with a graduated scale 14 of inches and fractions thereof. It gives the length of waist measurement and may also be employed to determine the linear depth of scye, or the measurement from the neck seam to the base of the arm scye. Said tape is also provided between its ends with a proportioned scale 15 that comes near the base of the arm scye and is provided to indicate depth of scye and attitude measurements in the same manner as in the device of my aforesaid application.

16 designates a tape which is adapted to extend around the body at a right angle to the back tape 11, and which is used for taking the bust, waist and blade measurements, and also various other measurements as will hereinafter be described.

17 designates a looped fitting which is applied to the tape 11 so as to slide up and down thereon. Said fitting comprises the loop portion 18, through which the tape 11 extends, and the rigid attaching arm 19. The tape 16 is adapted to be removably attached to said arm, the arm being shown as provided at its end with a stud 20 and the tape being provided with a complemental socket 21 adapted to engage over said stud. The said tape 16 is adapted to be passed beneath the arms and around the front of the figure, and its free end is laced through the loop 18, at right angles to the back tape. Said bust measuring tape and the back tape are temporarily fixed in place in proper angular relation to each other by means of a set screw 22 which extends through the outer member of the loop 18 and bears at its inner end against the tapes at the crossing point thereof and clamps said tapes against the back member of the loop so as to hold the tapes in proper relative adjustment. The said loop 18 is disposed at an angle of approximately forty-five degrees to the tapes 11 and 16 in order that the tapes, which are disposed at a right angle to each other, may pass freely therethrough, while permitting the tape 16 to slide up and down on the tape 11 when the clamping screw 22 is released.

The arm 19 is disposed at such an angle to the loop as to bring the end of the arm at one side of the loop, with the attaching button 20 thereof in approximate horizontal alinement with the center of the loop, or the set screw.

The end of the tape 16 extends such distance inwardly from the attaching socket 21 that when said tape is attached to the loop arm, the end of the tape 16 is in line with the center line 24 of the tape 11, which line is at the center line of the back. The said tape 16 is provided along its length with a graduated scale 25 of inches and fractions of inches for the purpose of taking the bust measurement and also in order that said tape may be used as a general measuring tape. Said tape is also provided with a proportioned scale 26 which is so disposed on the tape as to appear at the side of the bust in front of the arm scye, as indicated in Fig. 2. The said scale 26 is for the purpose of indicating the blade measurement and also the erect or stooping position of the figure being measured. The measurement on said scale 26 is read from a combined gage and crotch piece 28, shown in Figs. 2 and 5, which is provided on its rear side with a pair of hooks 29 adapted to fit over and slide on the upper edge of the tape 16. Said gage piece is also provided at its front lower corner with a recess 30, and the outer straight edge 31 thereof is adapted to register with the graduations of the proportioned scale 26, and from which edge said scale is read.

The tape 16, when in position around the bust gives the bust measurement, this measurement being taken with the tape close up against the arm pits. This measurement is calculated from the center line 24 of the tape 11, around the breast and back to said center line. The said scale 26 is so placed on the tape 16 that when said tape is in position to take the bust measurement, as indicated in full lines in Figs. 1 and 2, said scale appears in front of the arm scye. The blade measurement is taken by setting the gage piece 28 with its hooks 29 upon the tape and pressing said gage piece against the forward side of the shoulder. The graduation on the scale 26 which now appears in line with the straight edge 31 at the outer margin of the gage piece will indicate the blade measurement on the inch scale, and will also indicate the attitude of the figure on the proportional scale 26, whether it be a normal, stooping or over-erect posture, in the same general way as in the use of the device shown in my aforesaid application.

By loosening the set screw 22 the tape 16 may be moved downwardly along the tape 11 to the dotted line position indicated in Figs. 1 and 2 to take the waist measure of the garment. The tapes will preferably be made of celluloid or like non-shrinkable material which possesses the required flexibility.

The scales 15 and 26, in addition to indicating the depth of scye and blade measurements, respectively, are for determining the general attitude of the person being measured, with respect to the form and position of the shoulders; that is to say, whether the shoulders are normal, or whether they are higher or lower than normal, or are round or square. The point on the scale 15 at which the upper or gage margin of the tape 16 crosses the tape 11 indicates whether the shoulders are high or low, (sloping) or are normal in this respect. The said scale 15 is so located on the tape 11 and is so proportioned relatively to a known table of sizes, based upon normal human growth, that, when measuring a person of normal proportions, the upper margin of the tape 16, or other gage on the tape, will cross the scale 15 at the graduation point on the latter scale corresponding to the size of the bust measurement. For instance, if the bust measurement be 35 inches, the indicated point on the scale 15, for a normal person, will be that designated by 35 thereon. If the indicated number on the scale 15 be greater than the bust measurement, this indicates that the customer's shoulders are lower or more sloping than normal. This divergence from the normal will indicate to the cutter that the arm holes of the garment must be located lower than in a garment of normal proportions, and also indicates how much the arm holes must be lowered. A lower number shown on the scale 15 will indicate a reverse condition, or that the shoulders are higher or less sloping than normal. For the latter measurement the cutter will know that the arm holes must be placed higher than in a garment of normal proportions, and the divergence from the normal shown on scale 15 will indicate how much higher the arm holes must be placed. In the same general manner the scale 26 of tape 16 indicates on the blade measurement erect or stooping postures, also known as "square" or "round" shoulders. The scale 26 of tape 16 is so proportioned to a known table of sizes, based upon normal human growth, and is so placed on said tape that, for a person of normal proportions, it will indicate, when read from the edge 31 of gage 28, the same corresponding number or size as the bust measure. If the scale 26 indicates a larger number, it will show that the customer has a stooping posture. For instance, if the bust measurement be 36 inches and the blade measurement indicated on the proportioned scale 26 be 38 inches, this shows to the cutter that the proportions of the customer are not normal and that he must set the arm hole forward from a normal position a distance determined by the distance between the graduation marks 36 and 38 on the scale 26, thereby reducing the amount of cloth in the forepart of the garment and correspondingly increasing the amount of cloth at the back part of the garment. If a smaller number than that representing the bust measurement be indicated on the scale 26, this will show that the customer has an over-erect or some abnormal attitude, and the cutter, in cutting the pattern, will locate the arm holes in rear of the normal position.

From the foregoing it will be observed that the graduations of scales 15 and 26 are calculated on "sizes" based on normal human growth, and not on linear measurements, and that the "size" graduations bear definite relation to the bust measurement, as determined by the scale 25. For a coat or like garment of normal proportions, the cutter, knowing the bust measurement, will also know, from the table employed by him, based on normal human growth, the proper scye and blade measurements, and the deviations from said measurements indicated by the scales 15 and 26 will, with the same certainty, indicate the proper positions for the arm holes of a disproportionate garment. Thus it will be seen that the two proportioned attitude scales 15 and 26 will indicate normal attitude, if the customer is perfectly normal, and will also show deviations from the normal, either in the height or slope of shoulders, or relatively to stooping or erect attitudes, or both. The cutter having these measurements before him is enabled to properly locate the arm holes in the garment with respect to the customer's attitude, height of shoulder, posture, etc., as comprehensively as though he had taken the measurements himself and had observed the attitude of the customer.

The tape 16 may be detached from the stud 20 of the looped fitting 17, and the socket 21 carried by the tape engaged with a stud 33 at the upper end of the back tape, so that said tape 16 may be used to take the measurement of the front opening of the vest, and also to measure the front length thereof, as indicated in dotted lines in Fig. 2. The said tape 16 may similarly be attached to a stud 34 on the gage and crotch piece 28 so as to enable the tape to be used to take the inside seam measurement of the coat sleeve, as indicated in dotted lines in said Fig. 2. In like manner said tape 16 and the crotch and gage plate may be used to take the inside seam measurement of the trousers. The said stud 33 is set off from the center line 24 of the back tape such distance that when the tape is attached thereto, the end of said tape is in line with the said center line so that the measurement begins from the center line. In like manner the stud 34 on the crotch and gage piece is spaced at such distance from the side margin of said piece that when the tape 16 is snapped thereon the end of the tape will come even with the said side margin, as indicated in dotted lines in Fig. 2. When said tape 16 is detached from the other parts, it may be used as a simple tape for taking any measurements desired, in the same manner as an ordinary tape.

It is obvious that the device is reduced to an exceedingly simple form, as compared to the device shown in my aforesaid application. It is also obvious that the simplification of the device has sacrificed none of the advantages of the device shown in said prior application, but, on the other hand, has produced a superior article by making it easier to manipulate and capable of quicker and more accurate adjustments. The device, being exceedingly simple, does not require to be accompanied by extensive instructions, as a comparatively unskilled person may successfully use the same with little practice. It will be noted that the tape 16 is adjusted wholly from the back, and in a position from which it may be most accurately adjusted, inasmuch as the person taking the measurement is able to see that the tape is pressed closely up against the arm pits around the largest parts of the shoulder blades.

I claim as my invention—

1. In a tailor's measuring device, a neckpiece or clasp made of a strip of spring metal having spreadable ends and adapted to be fitted over and automatically adjust itself to the neck and a flexible back measuring tape attached to the rear or closed part of said clasp and provided at its lower end with means adapted to engage in the trousers to hold the tape taut.

2. In a tailor's measuring device, a neckpiece, a back measuring tape fixed thereto and provided at its lower end with means for fastening it to the trousers, a graduated bust measuring tape crossing the back tape at a right angle and provided with means for fastening it about the bust and a loop fitted over the bust and back tape at their intersection and through which both tapes freely slide, and having a single fastening device by which said tapes are detachably fastened at their point of crossing.

3. In a tailor's measuring device, a neckpiece, a back measuring tape fixed thereto and provided at its lower end with means for fastening it to the trousers, a graduated bust measuring tape crossing the back tape at a right angle and provided with means for fastening it about the bust, a single loop fitted over and disposed obliquely to the bust and back tapes at their intersection, through which both tapes freely slide and a single fastening device associated with said loop and for detachably locking said back and bust measuring tapes together at their point of crossing.

4. In a tailor's measuring device, the combination with a back measuring tape having means for holding the same centrally of the back and having a graduated scale, and a second, flexible tape which extends around the figure and crosses the back tape at or near the level of the base of the arm scye and having a graduated scale, said back tape having a supplemental, proportioned attitude size scale based on normal human growth adapted to read from a gage edge on the second tape.

5. In a tailor's measuring device, the combination with a back measuring tape having means for holding the same centrally of the back and having a graduated scale, and a second, flexible tape which extends around the figure and crosses the back tape at or near the level of the arm scye and having a graduated scale, said second tape having a supplemental proportioned attitude scale arranged to coöperate with the back measuring tape to indicate erect or stooping postures.

6. In a tailor's measuring device, the combination with a back measuring tape having means for holding the same centrally of the back and having a graduated inch scale, and a second, flexible tape which extends around the figure and crosses the back tape at or near the level of the arm scye and having a graduated inch scale, both tapes being provided with supplemental proportioned attitude scales, each based on normal human growth, and the scale of each tape being adapted to coöperate with the other tape, for the purpose set forth.

7. In a tailor's measuring device, the combination of a crotch piece and a graduated tape, said crotch piece comprising an elongated body having a curved edge adapted to fit the various crotches of the human body and being provided at its rear side with a downwardly opening rigid hook adapted to be supported by and slide on a tape and means affording ready attachment of the tape to and its detachment from the said crotch piece.

8. In a tailor's measuring device, the combination with a back measuring tape having means at its ends for holding it in place, a bust measuring tape having means for fastening the same around the body and a loop fitted over said tapes at their points of crossing through which both tapes are free to slide, of a crotch piece adapted to be fitted to the arm scye and a graduated tape attached to said crotch piece and adapted to be passed back beneath the arm and along the bust measuring tape to cross the back measuring tape.

9. In a tailor's measuring device, the combination with a back measuring tape having means at its ends for holding it in place, and a bust measuring tape having means for fastening the same around the body, of a crotch piece adapted to be fitted to the arm scye and provided with a hook adapted to slidingly and detachably engage and be supported on said bust measuring tape and provided with means to detachably fasten a tape thereto.

10. A tailor's measuring device comprising a spring, self-adjusting neck-piece, a vertical graduated tape attached at its upper end to said neck-piece and extending down the center of the back and provided at its lower end with means to hold it taut, a horizontal, graduated tape adapted to be passed about the figure and to cross the vertical tape at the back, a loop through which both tapes freely pass at their point of crossing and having means acting on both tapes to fasten them temporarily together, a crotch piece shaped to fit the various crotches of the human figure and having means by which it is supported on said horizontal tape and provided with means by which a tape may be detachably fastened thereto for use in taking various crotch measurements, and means for detachably fastening a tape to the upper end of the vertical tape for use in taking various measurements from the middle of the base of the neck.

11. A tailor's measuring device comprising a graduated back measuring tape having means to hold it centrally of the back, a combined bust, waist and blade measuring tape detachably connected to the back tape and slidable vertically and horizontally thereon and provided along its length with a graduated linear scale and between its ends with a proportioned "size" scale base on normal human growth to indicate the blade measurement and posture, the latter scale being independent of the linear scale and arranged at a selected distance from the end of the combined bust, waist and blade measuring tape, whereby the "size" scale appears at a predetermined position on the figure when the bust and blade measurements are being taken, and a gage to coöperate with said "size" scale, for the purpose set forth.

12. A tailor's measuring device comprising a graduated back measuring tape having means to hold it centrally of the back, a combined bust and blade measuring tape detachably and slidably connected to the back tape and provided along its length with a graduated linear scale and between its ends with a proportioned scale to indicate the blade measurement and posture, and a gage piece movable on the latter tape and shaped at one side to fit the front of the shoulder and provided at its other side with a straight edge adapted to coöperate with the graduations of the proportioned scale.

13. A tailor's measuring device comprising, in combination, a back measuring tape, a combined bust and blade measuring tape having means for detachably connecting it to the back measuring tape, said connecting means being constructed to hold the tapes in definite relative angular relation, said bust and blade measuring tape being provided with a graduated linear scale and with a blade and posture indicating scale, the latter arranged, when in position, to come in front of the shoulder, and a combined gage and crotch piece adapted to coöperate with the latter scale and having means for detachably fixing the bust and blade measuring tapes thereto, for the purpose set forth.

14. A tailor's measuring device comprising a back measuring tape having means to hold it centrally of the back, a loop slidable along said tape, a combined bust and blade measuring tape having means for detachably connecting it at one end to said loop, said latter tape being adapted to be passed around the bust beneath the arm pits and to be laced at its free end through the loop, and a single locking device carried by the loop for locking both of said back and combined bust and blade measuring tapes in fixed relation to each other.

15. A tailor's measuring device comprising a back measuring tape having means to hold it centrally of the back, a loop slidable along said tape and provided with an arm extending laterally therefrom, a bust and blade measuring tape adapted to be passed around the bust of the figure beneath the arm pits and provided at one end with means for detachably fastening it to said loop arm and adapted to be passed at its other end through the loop, and a single set screw screw-threaded to said loop for clamping both of said tapes in fixed relation with respect to each other.

16. The combination with a back measuring tape and a bust measuring tape, of a looped fitting comprising a loop portion through which the back tape and one end of the bust tape are adapted to pass and arranged at an oblique angle to both tapes and provided with an arm disposed obliquely to the loop portion and having means for detachably fastening thereto the other end of said bust tape.

17. A tailor's measuring device comprising a graduated back measuring tape having means to hold it centrally of the back, a horizontal tape adapted to be passed around the bust and provided with a graduated linear scale and with a proportioned size scale based on normal human growth to indicate blade measurement and posture, a loop slidable along the back measuring tape provided with an arm having a stud, the second tape being provided at one end with a socket to engage said stud to detachably fasten the latter to said arm, a single fastening device carried by the loop to lock said tapes together in fixed angular relation, and a stud on the upper end of the back measuring tape near the neck adapted to be engaged by the socket of the second tape.

In testimony, that I claim the foregoing as my invention I affix my signature in the presence of two witnesses, this 15th day of March A. D. 1910.

MAX GOLDBERGER.

Witnesses:
 WILLIAM S. HALL,
 WILLIAM GOLDBERGER.

---

Copies of this patent may be obtained for five cents each, by addressing the "Commissioner of Patents, Washington, D. C."